(12) United States Patent
Hansen

(10) Patent No.: US 11,932,951 B2
(45) Date of Patent: Mar. 19, 2024

(54) METHOD FOR GENERATING SYNTHESIS GAS FOR AMMONIA PRODUCTION

(71) Applicant: HALDOR TOPSØE A/S, Kgs. Lyngby (DK)

(72) Inventor: John Bøgild Hansen, Humlebæk (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 414 days.

(21) Appl. No.: 16/641,007

(22) PCT Filed: Oct. 1, 2018

(86) PCT No.: PCT/EP2018/076616
§ 371 (c)(1),
(2) Date: Feb. 21, 2020

(87) PCT Pub. No.: WO2019/072608
PCT Pub. Date: Apr. 18, 2019

(65) Prior Publication Data
US 2021/0032761 A1 Feb. 4, 2021

(30) Foreign Application Priority Data
Oct. 11, 2017 (DK) .......................... PA 2017 00568

(51) Int. Cl.
*C25B 1/04* (2021.01)
*C25B 1/27* (2021.01)

(52) U.S. Cl.
CPC . *C25B 1/04* (2013.01); *C25B 1/27* (2021.01)

(58) Field of Classification Search
CPC ........ C01B 2203/068; C25B 1/00; C25B 1/27
See application file for complete search history.

(56) References Cited

U.S. PATENT DOCUMENTS

| 3,367,882 | A | * | 2/1968 | Marshall, Jr. ............. C01B 3/16 252/376 |
| 4,213,953 | A | | 7/1980 | Mandrin |
| 2006/0049063 | A1 | | 3/2006 | Murphy et al. |

(Continued)

FOREIGN PATENT DOCUMENTS

| CN | 103068723 A | 4/2013 |
| CN | 103502397 A | 1/2014 |

(Continued)

OTHER PUBLICATIONS

Cinti et al, Coupling Solid Oxide Electrolyser (SOE) with Ammonia Production Plant, Applied Energy 192 (2017) 466-476 (Year: 2017).*

(Continued)

*Primary Examiner* — Salil Jain
(74) *Attorney, Agent, or Firm* — Boone IP Law

(57) ABSTRACT

In a method for generating ammonia synthesis gas by electrolysis, comprising feeding a mixture of steam and compressed air into the first of a series of electrolysis units and passing the outlet from one electrolysis unit to the inlet of the next electrolysis unit together with air, the electrolysis units are run in endothermal mode and the nitrogen part of the synthesis gas is provided by burning the hydrogen produced by steam electrolysis by air in or between the electrolysis units. The electrolysis units are preferably solid oxide electrolysis cell (SOEC) stacks.

16 Claims, 1 Drawing Sheet

(56) References Cited

U.S. PATENT DOCUMENTS

| | | | |
|---|---|---|---|
| 2008/0311022 A1* | 12/2008 | Carrington | C01C 1/0405 |
| | | | 204/242 |
| 2012/0003552 A1 | 1/2012 | Barnett et al. | |
| 2012/0241328 A1 | 9/2012 | Joshi et al. | |
| 2012/0273391 A1 | 11/2012 | Dindi et al. | |
| 2012/0329645 A1 | 12/2012 | Skjoeth-Rasmussen et al. | |
| 2015/0329979 A1 | 11/2015 | Reytier et al. | |
| 2016/0083260 A1 | 3/2016 | Dahl et al. | |
| 2016/0308225 A1 | 10/2016 | Noponen et al. | |
| 2017/0252739 A1 | 9/2017 | Hansen et al. | |
| 2017/0279134 A1 | 9/2017 | Reytier et al. | |

FOREIGN PATENT DOCUMENTS

| | | | |
|---|---|---|---|
| CN | 105209373 A | 12/2015 | |
| CN | 106185984 A | 12/2016 | |
| CN | 206070012 U | 4/2017 | |
| CN | 106868529 A | 6/2017 | |
| JP | S55054580 A | 4/1980 | |
| JP | 2006016300 A * | 1/2006 | B01J 8/067 |
| WO | 2008154257 A2 | 12/2008 | |

OTHER PUBLICATIONS

Office Action (Translation of the Examination Report) dated Feb. 22, 2022, by the Taiwan Intellectual Property Office in corresponding Taiwanese Patent Application No. 107135598, English Translation only. (4 pages).

Hansen, et al., "Solid Oxide Cell Enabled Ammonia Synthesis and Ammonia Based Power Production", NH3 Fuel Assoc, Oct. 2017, pp. 1-18, https://nh3fuelassociation.org/2017/10/01/solid-oxide-cell-enabled-ammonia-synthesis-and-ammonia-based-power-production/.

International Search Report (PCT/ISA/210) and Written Opinion (PCT/ISA/237) dated Jan. 30, 2019, by the European Patent Office as the International Searching Authority for International Application No. PCT/EP2018/076616.

Search Report dated Apr. 12, 2018, by the Danish Patent Office for Application No. PA 2017 00568.

Office Action (Text of the First Office Action) dated Aug. 31, 2021, by the China National Intellectual Property Administration in corresponding Chinese Patent Application No. 201880066165.5, and an English Translation of the Office Action. (13 pages).

Hansen, J. B. et al."The SOC4NH3 Project. Production and use of Ammonia by Solid Oxide Cells" ECS Transactions, vol. 91, No. 1, 2019, pp. 2455-2465.

Cinti, G, et al"Coupling Solid Oxide Electrolyser (SOE) and ammonia production plant" Elsevier, Applied Energy, vol. 192, (2017), pp. 466-476.

Pfromm, P.H. et al."Towards sustainable agriculture: Fossil-free ammonia" Journal of Renewable and Sustainable Energy, vol. 9, (2017), 12 pages.

Murakami, T. et al."Electrolytic Synthesis of Ammonia in Molten Salts under Atmospheric Pressure" J. Am. Chem. Soc., 2003, vol. 125, pp. 334-335.

Frattini, D. et al."A system approach in energy evaluation of different renewable energies sources integration in ammonia production plants" Elsevier, Renewable Energy, vol. 99 ,(2016), pp. 472-482.

Beerbuehl, S.S. et al"Ammoniaksynthese als Beispiel einer stofflichen Nutzung von intermittierend erzeugtem Wasserstoff—Synthesis of Ammonia from Intermittently Generated Hydrogen" Chem. Ing. Tech., 2014, vol. 86, No. 5, pp. 649-657.

Wang, G. et al."Conceptual Design of Ammonia-Based Energy Storage System: System Design and Time-Invariant Performance" AIChE Journal, May 2017 vol. 63, No. 5, pp. 1620-1637.

* cited by examiner

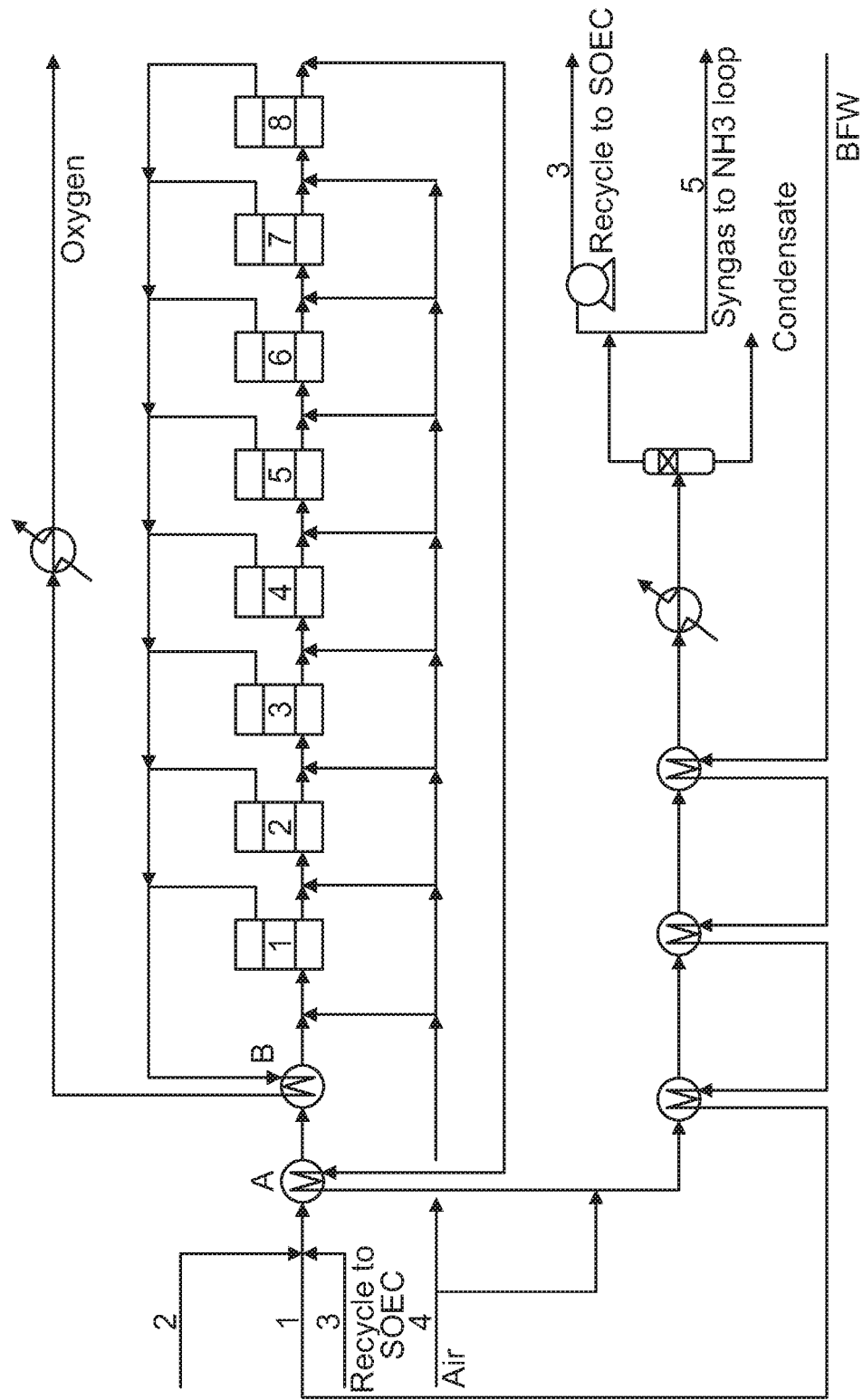

METHOD FOR GENERATING SYNTHESIS GAS FOR AMMONIA PRODUCTION

TECHNICAL FIELD

The present invention relates to a novel method for generating synthesis gas for ammonia production. In a specific embodiment of the method, the synthesis gas is generated by using solid oxide electrolysis cell (SOEC) stacks.

BACKGROUND AND SUMMARY

A typical ammonia-producing plant first converts a desulfurized hydrocarbon gas, such as natural gas (i.e. methane) or LPG (a liquefied petroleum gas, such as propane and butane) or petroleum naphtha into gaseous hydrogen by steam reforming. The hydrogen is then combined with nitrogen to produce ammonia via the Haber-Bosch process $$3H_2+N_2 \rightarrow 2NH_3$$

Thus, the synthesis of ammonia ($NH_3$) requires a synthesis gas (syngas) comprising hydrogen ($H_2$) and nitrogen ($N_2$) in a suitable molar ratio of about 3:1.

Ammonia is one of the most widely produced chemicals, and it is synthesized directly using gaseous hydrogen and nitrogen as reactants without precursors or by-products. In its gaseous state, nitrogen is largely available as $N_2$, and it is normally produced by separating it from atmospheric air. The production of hydrogen ($H_2$) is still challenging and, for industrial synthesis of ammonia, it is most often obtained from steam methane reforming (SMR) of natural gas. Moreover, when air is used for reforming processes, $N_2$ is also introduced, thus rendering the need for an air separation unit superfluous, but a clean-up process is necessary to remove oxygen-containing species, such as $O_2$, CO, $CO_2$ and $H_2O$, in order to prevent the catalysts from being poisoned in the ammonia converter. Carbon dioxide is a product of SMR and can be separated and recovered inside the plant. Hydrogen production is therefore a critical process in ammonia synthesis, and a sustainable production of ammonia is desirable to reduce the consumption of a primary source, such as natural gas, and to avoid $CO_2$ emissions from the process.

The basic idea underlying the present invention is to make ammonia synthesis gas by electrolysis, e.g. in SOEC stacks, without having to use air separation. Of course SOEC can be used to produce the necessary hydrogen, but then a separate air separation device would be necessary. Such devices, especially small-scale, are expensive. The idea is then to burn off the air inside the electrolysis unit, such as the SOEC stack, or between the units and basically utilize the ability of the unit to separate oxygen from hydrogen.

So the present invention provides a method for generating synthesis gas for ammonia production by electrolysis, preferably by means of SOEC stacks. The method avoids any use of an air separation unit (cryogenic, pressure swing adsorption or the like) by taking advantage of the ability of being operated in an endothermal mode, and it provides the necessary nitrogen by burning the hydrogen produced by steam electrolysis by air. In the preferred embodiment, in which SOEC stacks are used, the combustion of hydrogen can take place inside the stacks or between separate stacks.

More specifically, the invention relates to a method for generating ammonia synthesis gas by electrolysis, said method comprising the steps of:

feeding a mixture of steam and compressed air into the electrolysis unit or into the first of a series of electrolysis units and passing the outlet from one electrolysis unit to the inlet of the next electrolysis unit, either together with air added after each electrolysis unit or only adding air after the last electrolysis unit, wherein the electrolysis units are run in thermoneutral or endothermal mode and the nitrogen part of the synthesis gas is provided by burning the hydrogen produced by steam electrolysis by air in or between the electrolysis units.

The feature of only adding air before and after the electrolysis unit(s) leads to a slightly increased energy consumption, but on the other hand it is much easier to implement, and still the air separation can be avoided.

The electrolysis units are preferably SOEC stacks. When SOEC stacks are used as electrolysis units, the operating voltage of the stacks is preferably below the so-called thermoneutral voltage, which is the minimum thermodynamic voltage at which a perfectly insulated electrolysis unit would operate, if there is no net inflow or outflow of heat. The burning of the hydrogen produced by steam electrolysis by air can be done inside the SOEC stacks or between separate SOEC stacks.

In a preferred embodiment, the steam used is steam from an ammonia synthesis loop, which is mixed with recycle ammonia synthesis gas.

The operating voltage of the stacks being below the thermoneutral voltage means that the temperature will decrease across an adiabatic stack. The inlet temperature to the subsequent stack is then increased again by combusting a fraction of the formed hydrogen in air, thus providing the nitrogen needed for the ammonia synthesis reaction that is carried out in a separate synthesis loop.

It is well known that the hydrogen needed for ammonia synthesis can be provided electrolytically, e.g. by water electrolysis, which has indeed been practiced in industrial scale.

The required nitrogen for the ammonia synthesis is then generated by air separation, either by cryogenic separation, by pressure swing adsorption (PSA) or by the use of membranes. Such separate air separation units constitute a costly investment, and they require regular maintenance in the case of PSA or membranes. The present invention eliminates these problems.

The preparation of ammonia synthesis gas by electrolysis has been described in various patents and patent applications. Thus, a method for the anodic electrochemical synthesis of ammonia gas is described in US 2006/0049063. The method comprises providing an electrolyte between an anode and a cathode, oxidizing negatively charged nitrogen-containing species and negatively charged hydrogen-containing species present in the electrolyte at the anode to form adsorbed nitrogen species and hydrogen species, respectively, and reacting the adsorbed nitrogen species with the adsorbed hydrogen species to form ammonia.

In US 2012/0241328, ammonia is synthesized using electrochemical and non-electrochemical reactions. The electrochemical reactions occur in an electrolytic cell having a lithium ion-conductive membrane that divides the electrochemical cell into an anolyte compartment and a catholyte compartment, the latter including a porous cathode closely associated with the lithium ion-conductive membrane.

WO 2008/154257 discloses a process for the production of ammonia that includes the production of nitrogen from the combustion of a stream of hydrogen mixed with air. Hydrogen used to produce the nitrogen for an ammonia combustion process may be generated from the electrolysis of water. Hydrogen produced by electrolysis of water may also be combined with nitrogen to produce ammonia.

So far, little attention has been paid to ammonia production using synthesis gas produced by electrolysis, especially generated using SOEC stacks. Recently, the design and analysis of a system for the production of "green" ammonia using electricity from renewable energy sources has been described (Applied Energy 192 (2017) 466-476). In this concept, solid oxide electrolysis (SOE) for hydrogen production is coupled with an improved Haber-Bosch reactor, and an air separator is included to supply pure nitrogen. An ammonia production with zero $CO_2$ emission is said to be obtainable with a 40% power input reduction compared to equivalent plants.

A flexible concept for the synthesis of ammonia from intermittently generated $H_2$ is described (Chem. Ing. Tech. 86 No. 5 (2014), 649-657) and compared to the widely discussed power-to-gas concepts on a technical and economical level.

The electrolytic synthesis of ammonia in molten salts under atmospheric pressure has been described (J. Am. Chem. Soc. 125 No. 2 (2003), 334-335), in which a new electrochemical method with high current efficiency and lower temperatures than in the Haber-Bosch process is used. In this method, nitride ion ($N^{3-}$), produced by the reduction of nitrogen gas at the cathode, is anodically oxidized and reacts with hydrogen to produce ammonia at the anode.

Frattini et al. (Renewable Energy 99 (2016), 472-482) describe a system approach in energy evaluation of different renewable energy sources integrated in ammonia production plants. The impact of three different strategies for renewables integration and scale-up sustainability in the ammonia synthesis process was investigated using thermochemical simulations. For a complete evaluation of the benefits of the overall system, the balance of plant, the use of additional units and the equivalent greenhouse gas emissions have been considered.

Pfromm (J. Renewable Sustainable Energy 9 (2017), 034702) describes and sums up the most recent state of the art and especially the renewed interest in fossil-free ammonia production and possible alternatives to the Haber Bosch process.

Finally, Wang et al. (AIChE Journal 63 No. 5 (2017), 1620-1637) deal with an ammonia-based energy storage system utilizing a pressurized reversible solid oxide fuel cell (R-SOFC) for power conversion, coupled with external ammonia synthesis and decomposition processes and a steam power cycle. Pure oxygen, produced as a side product in electrochemical water splitting, is used to drive the fuel cell.

BRIEF DESCRIPTION OF THE DRAWINGS

FIG. 1 shows the layout of a particular embodiment.

DETAILED DESCRIPTION

The invention is described in more detail in the following example with reference to the FIG. 1, showing the layout of one particular embodiment.

EXAMPLE

Superheated steam at 400° C. and 40 barg (1), generated in the ammonia synthesis loop (2) and in an SOEC electrolysis unit consisting of eight identical SOEC stacks (numbered 1-8), is mixed with recycle ammonia synthesis gas (3), which is a mixture of hydrogen and nitrogen, preferably in the stoichiometric 3:1 ratio. The mixture is sent through a first (A) and a second (B) feed/effluent heat exchanger, where it is heat exchanged using the gas coming from the cathode (fuel) side of the SOEC stacks and from the anode (oxygen) side of the SOEC stacks, respectively. Compressed air (4) at 40 barg is then added to a catalytic burner (not shown in the FIGURE), and the temperature increases to 785° C. at the inlet to the first SOEC stack. The stack is operated at 1175 mV per cell, resulting in a temperature drop across the stack to 692° C. at the outlet. Compressed air is added to the effluent from the first SOEC stack in an amount resulting in a temperature of 785° C. at the second SOEC stack inlet. The second stack is operated at a voltage of 1196 mV per cell, resulting in an outlet temperature of 722° C. This air addition is repeated five time between stacks (the total number of SOEC stacks being eight).

After heat exchange with incoming steam and recycle gas in the first heat exchanger (A), supplementary air is added so that the final gas composition is stoichiometric ammonia synthesis gas and the need for steam to the SOEC unit is covered. The supplementary steam in addition to the amount generated in the ammonia synthesis loop is obtained by cooling the gas after the final air addition point.

Finally, the non-converted steam is condensed out in a condenser (C), and the gas is split into two streams: One stream (3) is re-compressed and recycled to the inlet of the SOEC unit, while the other stream (5) is further compressed and dried and then sent to the ammonia synthesis loop.

To avoid catalyst poisoning in the ammonia synthesis loop, $CO_2$ must be removed quantitatively from the air used. This can be done by known physical or chemical methods for $CO_2$ removal and/or by methanation of $CO_2$ and CO, which will be formed in the SOEC unit, in a methanation reactor prior to passing the syngas (5) to the synthesis loop.

The invention claimed is:

1. A method for generating a nitrogen part of ammonia synthesis gas by electrolysis, said method comprising the steps of:
    feeding a mixture of steam and compressed air into a first of a series of electrolysis units;
    applying an operating voltage in the first of the series of electrolysis units for electrolysis of the steam to oxygen on an anode side and hydrogen on a cathode side;
    passing a cathode side outlet from one electrolysis unit to an inlet of a next electrolysis unit of the series of electrolysis units; and
    either (a) adding compressed air after each electrolysis unit of the series of electrolysis units, or (b) only adding compressed air after a last electrolysis unit of the series of electrolysis units,
    wherein the series of electrolysis units are run in thermoneutral or endothermal mode, and
    wherein the method further comprises:
    providing the nitrogen part of the synthesis gas by burning the hydrogen produced by steam electrolysis by air inside the electrolysis units of the series of electrolysis units.

2. The method according to claim 1, wherein compressed air is only added before the first electrolysis unit and after the last electrolysis unit.

3. The method according to claim 1, wherein the electrolysis units are solid oxide electrolysis cell (SOEC) stacks.

4. The method according to claim 3, wherein the operating voltage of the SOEC stacks is below the so-called thermoneutral voltage.

5. The method according to claim 1, wherein the steam used is steam from an ammonia synthesis loop.

6. The method according to claim 5, wherein the steam is mixed with recycle synthesis gas.

7. The method according to claim 1, wherein compressed air is added after each electrolysis unit of the series of electrolysis units.

8. The method according to claim 1, wherein the method is free of use of an air separation unit.

9. A method for generating a nitrogen part of ammonia synthesis gas by electrolysis, said method comprising the steps of:
   feeding a mixture of steam and compressed air into an electrolysis unit;
   applying an operating voltage in the electrolysis unit for electrolysis of the steam to oxygen on an anode side and hydrogen on a cathode side;
   providing the nitrogen part of the synthesis gas by burning the hydrogen produced by steam electrolysis by air inside the electrolysis unit; and
   adding air after the electrolysis unit,
   wherein the electrolysis unit is run in thermoneutral or endothermal mode.

10. The method according to claim 9, wherein air is only added before and after the electrolysis unit.

11. The method according to claim 9, wherein the electrolysis unit is a solid oxide electrolysis cell (SOEC).

12. The method according to claim 11, wherein the operating voltage of the SOEC stack is below the thermoneutral voltage.

13. The method according to claim 11, wherein the burning the hydrogen is done inside the SOEC.

14. The method according to claim 9, wherein the steam used is steam from an ammonia synthesis loop.

15. The method according to claim 14, wherein the steam is mixed with recycle synthesis gas.

16. The method according to claim 9, wherein the method is free of use of an air separation unit.

* * * * *